No. 629,585. Patented July 25, 1899.
T. D. McCALL.
BICYCLE FRAME.
(Application filed Aug. 8, 1898.)

(No Model.)

WITNESSES:
C. G. Staude.
M. E. Gooley

INVENTOR.
THOMAS D. McCALL
BY Paul O Hawley
HIS ATTORNEYS.

THE NORRIS PETERS CO., PHOTO-LITHO., WASHINGTON, D. C.

UNITED STATES PATENT OFFICE.

THOMAS D. McCALL, OF MINNEAPOLIS, MINNESOTA.

BICYCLE-FRAME.

SPECIFICATION forming part of Letters Patent No. 629,585, dated July 25, 1899.

Application filed August 8, 1898. Serial No. 688,050. (No model.)

*To all whom it may concern:*

Be it known that I, THOMAS D. MCCALL, of the city of Minneapolis, county of Hennepin, State of Minnesota, have invented certain new and useful Improvements in Bicycle-Frames, of which the following is a specification.

This invention relates to frames for bicycles, and particularly to an improved frame for bicycles of the class shown and described in Letters Patent of the United States No. 587,992, granted August 10, 1897, to McCall and McCall. The bicycle shown in said patent is provided with driving-wheels or sprockets above the rear wheel of the bicycle and back of the seat, and owing to the presence of the driving wheel or wheels at this point an ordinary diamond frame for the bicycle is not desirable, owing to the inconvenience experienced by the rider in mounting and dismounting. A drop-frame is preferred where the driving mechanism shown in the aforesaid patent is used; but the ordinary drop-frame is not well adapted to the purpose; and the particular object of this invention is to provide a bicycle-frame that will stand the strains of the driving mechanism of the aforesaid patent, which will enable the rider to mount and dismount easily, which will possess great strength, and which will have a neat appearance.

A further object of the invention is to provide a strong frame for bicycles, whereby the rider will be relieved of much of the jar incident to riding over rough roads, and the further object is to improve the construction of the frames of ordinary bicycles.

The invention consists generally in various constructions and combinations, all as hereinafter described, and particularly pointed out in the claims.

Figure 1:
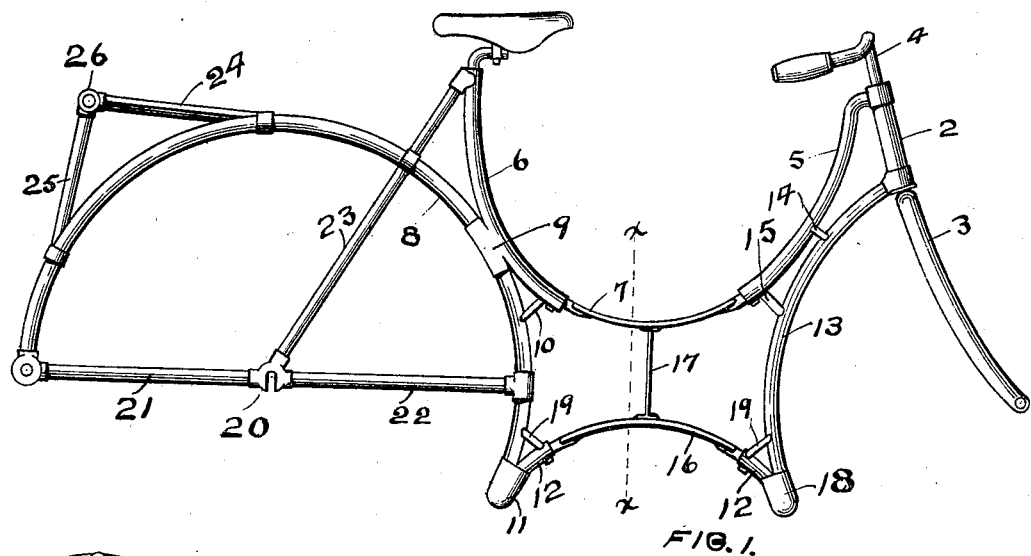
Figures 2, 3:
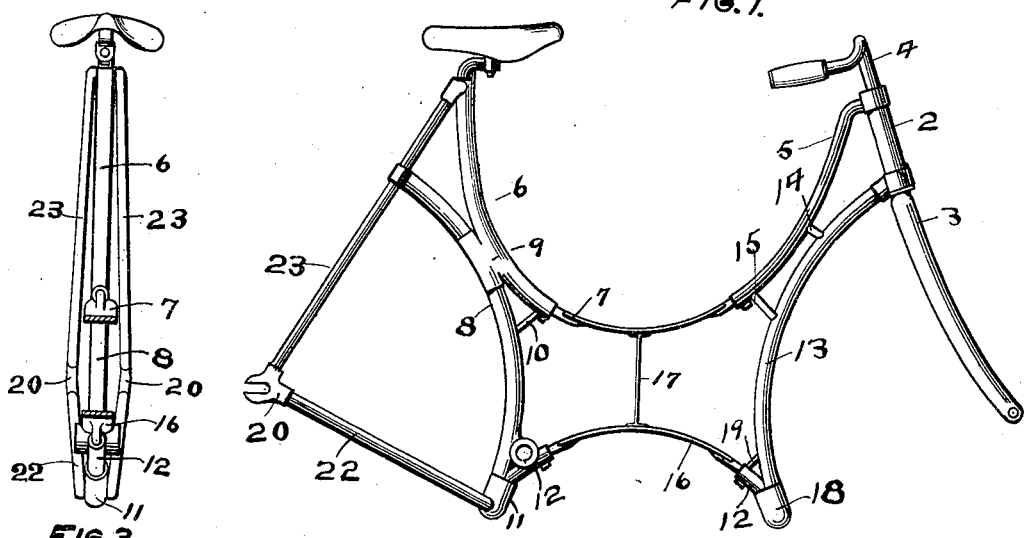

In the accompanying drawings, forming part of this specification, Figure 1 is a side elevation of a bicycle-frame embodying my invention. Fig. 2 is a similar view of a modified form of frame. Fig. 3 is a vertical sectional view on the line $x$ $x$ of Fig. 1.

In the drawings, 2 is a head of a bicycle-frame, wherein the forks 3 and handle-bar 4, of ordinary construction, are secured. From the top of the head 2 a curved bar 5 extends downwardly, and a similar-shaped bar 6 is arranged opposite said bar 5, supporting the saddle-post in its upper end, the lower ends of said bars 5 and 6 being connected by a part 7, which is preferably flexible. The mast or standard supporting the saddle-post is completed by a semicircular bar 8, preferably having a forked rear end from its point of intersection with the bar 23, forming the rear portion of the frame, said bar 8 being preferably brazed or clamped to the bar 6 at a point 9 and also preferably connected to said bar by a short brace 10. The lower forward end of the bar 8 has a cap 11, wherein one end of a short bar or stub 12 is secured, its outer end being connected to a similar bar provided on the lower end of the bar 13, which extends downwardly from the lower end of the head 2 and is curved oppositely from the bar 5 and connected therewith by short braces 14 and 15, thus insuring the rigidity of the forward end of the frame. The connection 16 between the short bars or stubs 12 corresponds to the part 7 in that it is preferably flexible, though curved in the opposite direction, and preferably connected with said bar 7 by a brace 17, arranged near the middle portion of the bars. A cap 18 is preferably provided at the lower end of the bar 13, inclosing said end and the stub 12 and giving a finished appearance to that portion of the frame. Braces 19 are preferably arranged between the stubs 12 and the bars 13 and 8. The bars 7 and 16 may be flexible or not, as preferred. The rider, however, will experience less jar and discomfort from riding over rough roads when the forward portion of the frame is constructed in the manner I have shown. The casting or part 20, wherein the axle of the rear wheel is supported, is preferably arranged at a point substantially midway between the ends of the semicircular bar 8 and is connected with said ends by parts 21 and 22, which form the horizontal rear forks of the frame. 23 are the upright forks connecting the part 20 with the upper end of the bar 6 at a point near the saddle-post and correspond substantially to the upright rear forks of the ordinary bicycle-frame, except that they are clamped rigidly to the bar 8 at their point of intersection therewith. In this improved form of frame I prefer to arrange the large sprockets and the bearing that in the ordinary bicycle-frame is known as the "center bearing" at a point above the rear wheel and behind the saddle. To this end I provide, preferably, horizontal braces 24, rigidly secured at their forward ends to the forks of the bar 8, and substantially upright braces 25, secured at their lower ends to the outer ends of the forks of the bar 8 and at their point of intersection with the bars 24, supporting the bearing 26 for the large sprocket-wheels.

In Fig. 2 I have shown a modified form of frame which consists in dispensing with the forks or rear portion of the bar 8 and placing the center bearing in the usual position at the foot of the standard or mast supporting the saddle and changing the position of the bars 22 from a horizontal to an inclined position, securing their forward ends to the lower forward end of the bar 8. In other respects the parts of this modified construction correspond to the parts already described. It will be observed that the circles, of which the curved portions of the frame form parts, are all of substantially the same radius, thus insuring an equal distribution of the strain throughout the frame, and the parts of the frame at its forward end being oppositely curved and rigidly secured and braced together form a much stiffer drop-frame than when constructed in the usual manner, while the flexible connections between the forward and rear portions of the frame prevent jar of the rider and any undue strain or shock to the frame while riding over a rough road. A further advantage lies in the fact that a drop-frame of extreme strength and rigidity is provided, much more easily mounted, and which is equally adapted for ladies' or gentlemen's use.

Having thus described my invention, I claim as new and desire to secure by Letters Patent—

1. In a bicycle-frame, the combination, with a head, of a semicircular bar forming the rear portion of the frame, a bearing supported upon the rear of said bar outside the circumference of the rear wheel, and oppositely-curved bars connecting the forward portion of said semicircular bar with said head, whereby a drop-frame is formed permitting the rider to mount and dismount over the front end of the saddle, substantially as described.

2. In a bicycle-frame, the combination, with a head, of a semicircular bar forming the rear portion of the frame, a bearing supported upon the rear end of said bar outside the circumference of the rear wheel and oppositely-curved flexible bars between the forward end of said semicircular bar and said head and forming a drop-frame permitting the rider to mount and dismount over the forward end of the saddle and preventing jar to the hands of the rider, substantially as described.

3. In a bicycle-frame, the combination, with a head, of a bar 8, a bar 6 connected with said bar 8 and forming therewith the mast or standard whereon the saddle is supported, forks 22 and 23, and oppositely-curved flexible bars between said bars 6 and 8 and said head and forming therewith a drop-frame permitting the rider to mount and dismount over the forward end of the saddle, substantially as described.

4. In a bicycle-frame, the combination, with a head 2, of a semicircular bar 8 having a forked rear end, a bearing 26 supported at the rear end of said bar 8, a bar 6 secured to the forward end of said bar 8 and forming therewith the mast or standard whereon the saddle is supported, oppositely-curved bars 5 and 13 connected to said head and oppositely-curved flexible bars 7 and 16 connecting respectively said bars 5 and 13 and said bars 6 and 8 and forming therewith a drop at the forward portion of the frame, substantially as described.

5. In a bicycle-frame, the combination, with a head 2, of bars 5 and 13 connected thereto and bars 6 and 8 forming the mast or standard whereon the saddle is supported, an inclined fork 23 connecting said bars 6 and 8, a substantially horizontal fork 22 and oppositely-curved flexible bars 7 and 16 connecting, respectively, said bars 5 and 13 and said bars 6 and 8, substantially as described.

In testimony whereof I have hereunto set my hand, this 25th day of July, 1898, at Minneapolis, Minnesota.

THOMAS D. McCALL.

In presence of—
C. G. HAWLEY,
M. E. GOOLEY.